M. J. BABB.
ARTICULATOR.
APPLICATION FILED APR. 6, 1917.
1,285,896.
Patented Nov. 26, 1918.
4 SHEETS—SHEET 3.
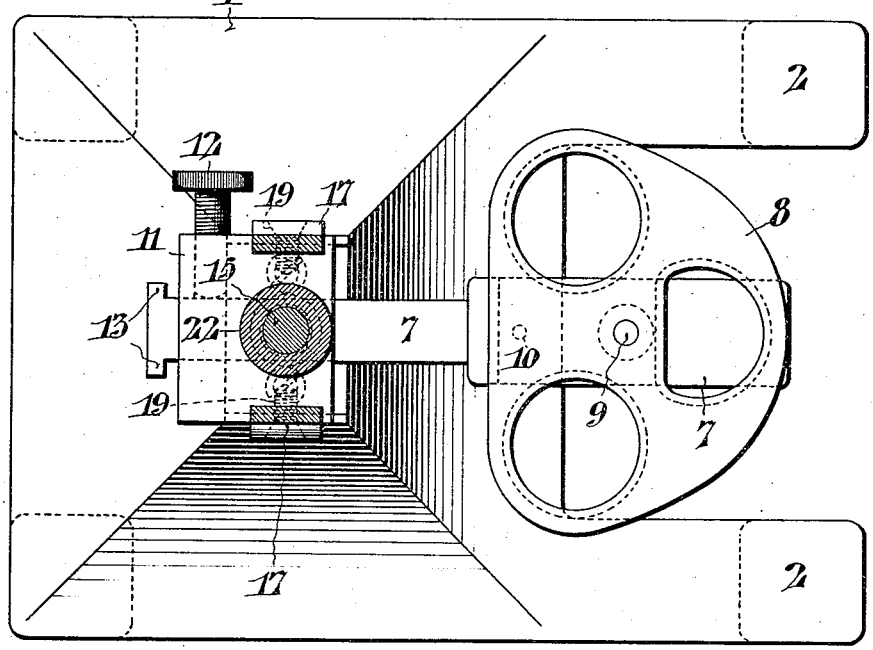
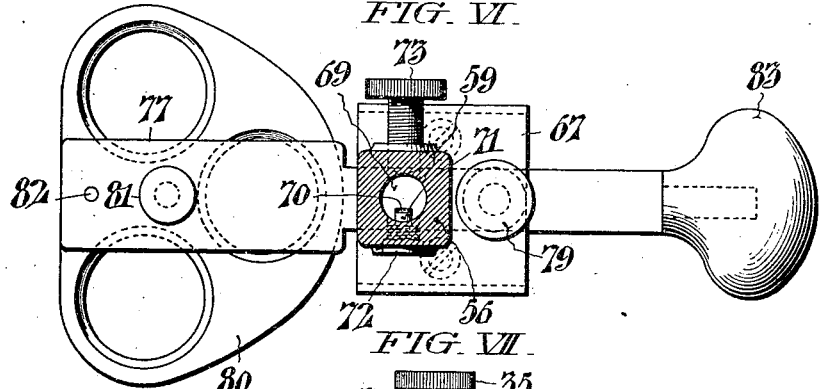
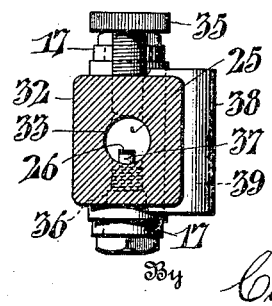
Inventor
Maurice J. Babb,
Witness

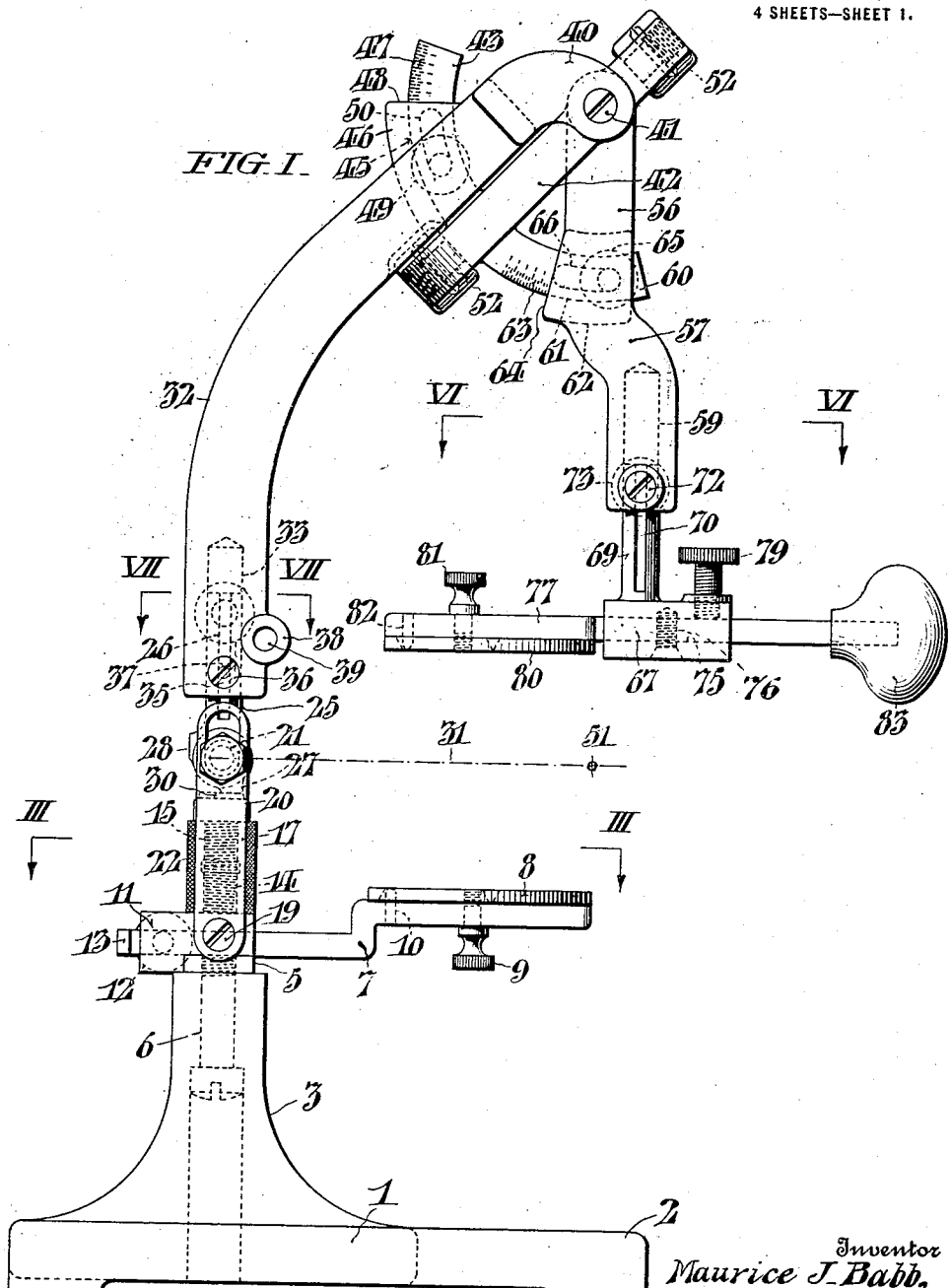

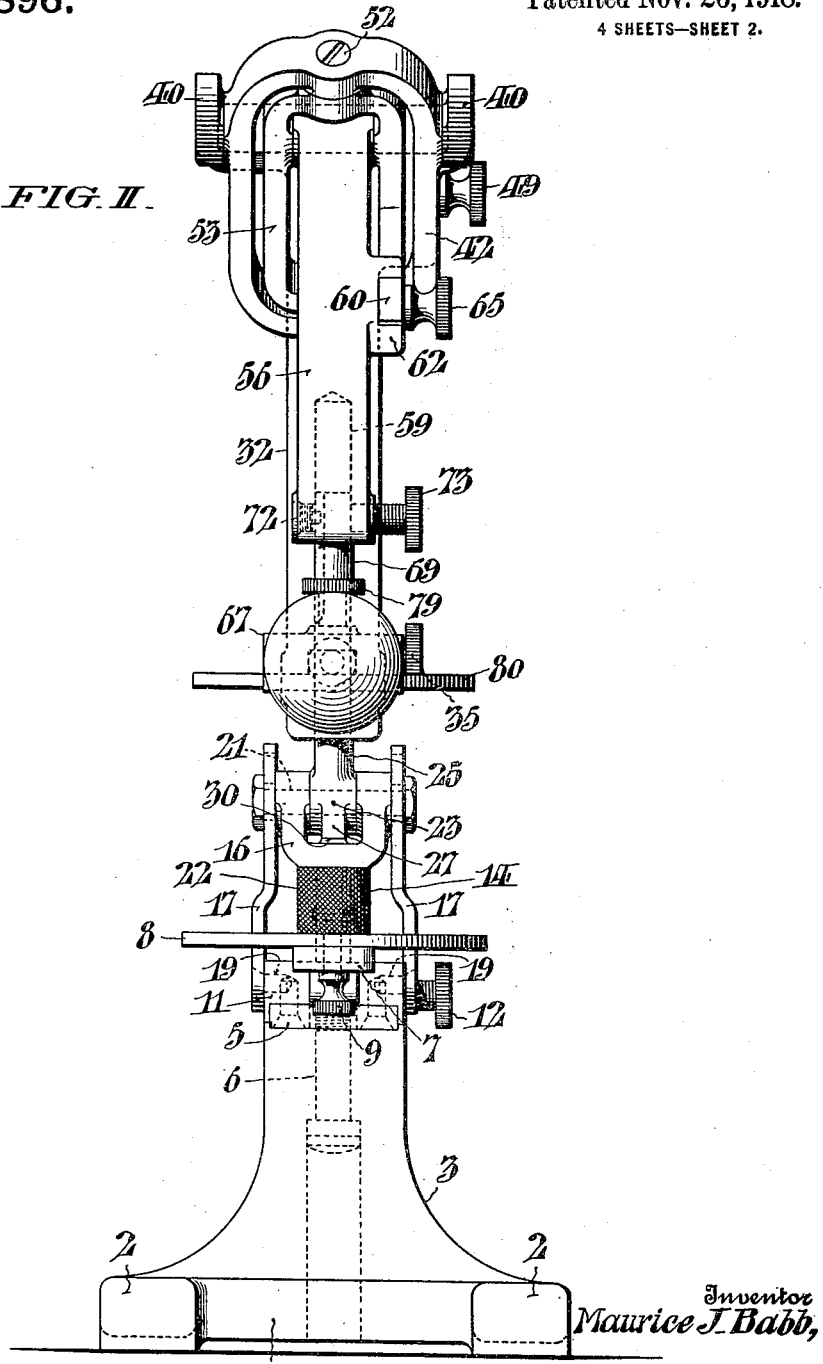

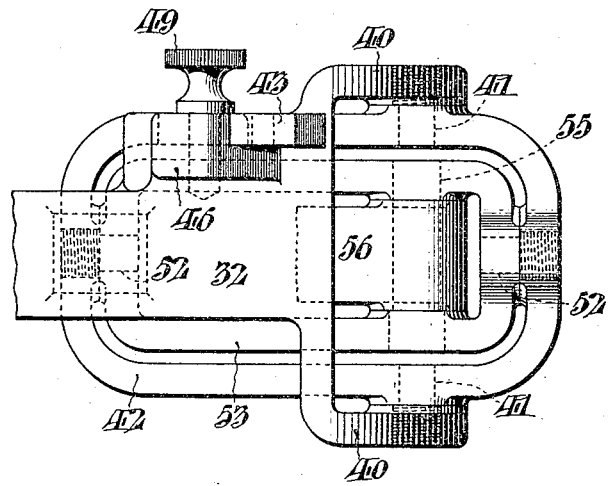
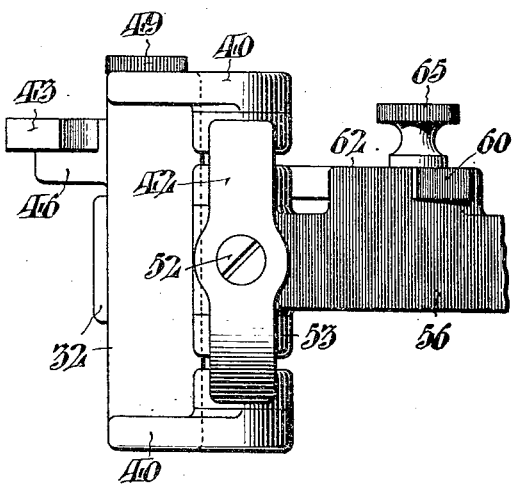
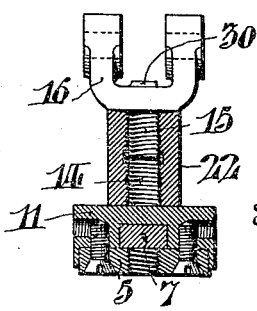

UNITED STATES PATENT OFFICE.

MAURICE J. BABB, OF ARDMORE, PENNSYLVANIA, ASSIGNOR TO THE S. S. WHITE DENTAL MANUFACTURING COMPANY, A CORPORATION OF PENNSYLVANIA.

ARTICULATOR.

1,285,896.  Specification of Letters Patent.  Patented Nov. 26, 1918.

Application filed April 6, 1917. Serial No. 160,321.

*To all whom it may concern:*

Be it known that I, MAURICE J. BABB, a citizen of the United States, and a resident of Ardmore, in the county of Montgomery, State of Pennsylvania, have invented certain new and useful Improvements in Articulators, of which the following is a specification, reference being had to the accompanying drawings.

My invention relates particularly to that class of devices which are generally known as dental articulators, and which are arranged to support sets of artificial teeth for relative movement in such relation as to simulate the natural movements of teeth carried by the human jaw.

The principal objects of my invention are, to provide a dental articulator comprising mechanism that will not only reproduce with precision the natural relative masticatory movements of the human jaw, but which may be so adjusted as to accurately coincide with the measurements and conditions that may be found in each individual patient, either from casts taken of the mouth or from measurements of the jaw.

Other objects of my invention are, to provide an articulator which may be so adjusted as to accommodate longer or shorter teeth, to vary the length of the bite without retaking an impression of the patient's mouth, or in which new teeth may be introduced to replace broken or defective teeth in the denture and ground to proper occlusion, and to provide a machine useful for orthodontists in determining the proper occlusion of malposed teeth.

Specifically stated, my invention comprehends an articulator in which the axis of relative oscillation of the jaw model holders is inclined with respect to the plane of occlusion of the jaw models, and is adjustable to vary the angle of inclination with respect to said plane of occlusion, about a point above the central incisal point, and wherein the jaw model holders may be lineally adjusted normal to said plane of occlusion.

My invention also includes all of the various novel features of construction and arrangement as hereinafter more definitely specified.

In the accompanying drawings, Figure I is a side elevational view of an articulator constructed in accordance with my invention, showing the parts in position to articulate jaw models which may be carried thereby; Fig. II is a front elevational view of the articulator shown in Fig. I; Fig. III is a horizontal plan sectional view of said articulator, taken on the line III—III in Fig. I; Fig. IV is a fragmentary view of that part of the articulator by which the axis of oscillation of the upper jaw model may be adjusted as viewed from a plane parallel with said axis; Fig. V is a fragmentary view as seen from a plane transversely normal to said axis, forward of said articulator; Fig. VI is a sectional view, taken on the line VI—VI in Fig. I, and showing the plan of the upper jaw model holder; Fig. VII is a horizontal sectional view taken on the line VII—VII in Fig. I; and Fig. VIII is a central vertical sectional view, showing the means of lineal adjustment between the upper and lower jaw model holders.

In said figures, the base 1 having the forwardly extending feet 2 provides the pedestal 3, upon which the slide plate 5 is secured by the screw 6 extending upwardly through said pedestal. Said slide plate 5 serves as a bearing for slidably supporting the lower jaw model holder 7, which carries the jaw model mounting 8 secured thereon by the set-screw 9 and is prevented from rotary displacement by the dowel pin 10, and which is guided for longitudinal adjustment by the guide-block 11, secured in any adjusted position by the set-screw 12 and limited in its forward movement by the projections 13 extending laterally from the rear end of said jaw model holder.

The guide-block 11 is provided with the upwardly extending threaded shank 14, against the free end of which is normally abutted the free end of the oppositely threaded shank 15 of the lower hinge member 16, which is adjustably connected with the guide-block 11 by the oppositely disposed links 17 secured to said guide-block 11 by screws 19 and having longitudinally elongated slots 20 through which the hinge shaft, comprising the bolt 21, extends. The relative adjustment of the lower hinge member 16 and said guide-block 11 may be conveniently effected by the knurled sleeve 22, which is in threaded engagement with the receptive shanks 14 and 15 and serves as a turn-buckle, by the rotation of which the said shanks and the parts connected therewith may be separated or caused to approach, as desired. This adjustment is highly advantageous as a feed in grinding the teeth and may be gradually effected as the grinding action wears the teeth down to proper occlusion.

The upper hinge member 23 provides the upwardly extending post 25 having the slot or keyway 26 extending longitudinally therein. Said upper hinge member 23 is provided with stop lugs 27 and 28 arranged to engage the stop pad 30 on the lower hinge member 16, the purpose of which is to limit the oscillatory movement of said hinge member to approximately ninety degrees and respectively hold said post in a vertical, horizontal, or intermediate position, as desired.

The axis of the bolt 21 should always be situated in the medial position or occlusal plane 31, between the mountings 8 and 80, and is arranged to permit the free relative movement of the jaw model holders about its axis, or may be adjusted to secure the said jaw model holders in any desired relative position.

The post 25 is arranged to carry the upwardly and forwardly extending super-support 32, which is provided with a socket 33 into which said post extends in vertically adjustable relation, and said super-support 32 may be secured thereto in such adjusted relation by the set-screw 35. The support 32 is also provided with a threaded key 36 having a projection 37 extending into the slot or keyway 26, to prevent the rotation of said support 32 upon said post and thereby maintaining the forwardly extending upper portion thereof in the medial vertical longitudinal plane of the articulator. Said support 32 is also provided with the boss 38 having the bore 39 for the convenient attachment of measuring and setting devices, such as arch-bow mechanism of any convenient form.

The upper end of the support 32 is bifurcated and provides the spaced bearing lugs 40, which are provided with trunnions 41 pivotally supporting the frame or yoke 42, which is preferably rectangular in form and provided with a sector 43 arranged to slide in an arcuate groove 45, serving as a guide in the suitably provided boss 46 on the support 32, and said sector 43 is provided with suitable graduations 47 arranged to register with the upper surface 48 of said boss 46. Said yoke 42 is arranged to be securely held in adjusted position with respect to the support 32 by the set-screw 49, which extends through the slot 50 in the sector 43 and which is in threaded engagement with said support 32.

The yoke 42, as best shown in Fig. I, is pivoted for oscillation on the trunnions 41, near its upper end, at a point determined from measurement as the center of oscillation of the incisal point 51, and in a perpendicular to the occlusal plane 31 in the region of said incisal point 51. Said yoke 42 is provided with trunnions 52 at its opposite ends upon a common axis extending transversely of the axis of the trunnions 41 and inclined in a plane in acute angular relation with the plane of the plane of occlusion.

The trunnions 52 support the frame or yoke 53, which is disposed within the yoke 42 and preferably conforms substantially thereto. Said yoke 53 is provided with a shaft 55 having its axis extended transversely with respect to the axis of the trunnions 52, and when said yokes occupy the same plane, the axis of the shaft 55 is coincident with the axis of the trunnions 41.

The shaft 55 pivotally supports the depending hanger 56, which is preferably offset forwardly at 57 and is provided with the socket 59. The inner yoke 53 is provided with the forwardly extending sector 60 arranged to slide in the arcuate groove or slot 61 serving as a guide in the boss 62 on one side of the hanger 56, and is provided with graduations 63 arranged to register with the rear surface 64 of said boss 62, whereby the hanger may be adjusted with respect to the axis of the trunnions 52 in such relation that said hanger will depend perpendicularly, irrespective of the inclined position of the plane through which said axis may be disposed when adjusted. Said hanger 56 is arranged to be securely held in adjusted position by the set-screw 65, which extends through the slot 66 in the sector 60 and which is in threaded engagement with the hanger 56.

It may be here noted that when the sector 43 is shifted to change the inclination of the axis of the trunnions 52, the extent of adjustment may be determined by the graduations 47, and similarly, the hanger 56 may be adjusted to a corresponding extent with respect to the graduations 63 on the sector 60 to insure the perpendicular position of said hanger 56 with respect to the plane of the base, and also with respect to the plane of occlusion of the jaw models which may be carried by the articulator, which occlusal plane is substantially parallel with the plane of the base.

The hanger 56 is arranged to support the slide-block 67, having the post 69 arranged to extend into the socket 59 in said hanger 56, and having the longitudinally extended slot 70 into which the projection 71 on the threaded key 72 in said hanger 56 extends to prevent relative rotation of said slide-block with respect to said hanger. Said slide-block 67 may be vertically adjusted with respect to the hanger 56 and secured in any desired adjusted position by the thumb-screw 73, which is in threaded engagement with said hanger 56.

The slide-block 67 is provided with a plate 75 secured thereto by screws 76 and affords a guide in which the upper jaw model holder 77 is slidably adjustable, longitudinally, and may be secured in any adjusted position by the thumb-screw 79 which is in threaded engagement with said slide-block 67.

The upper jaw model holder carries the upper jaw model mounting 80, which is secured thereto by the thumb screw 81 extended through said jaw model holder 77 and in threaded engagement with said jaw model mounting 80, the latter being prevented from relative rotation by the dowel pin 82. Said jaw model holder 77 is extended forwardly and is conveniently provided with the knob or handle 83, by which it may be actuated to effect the articulation of the teeth of the jaw models when mounted upon the respective jaw model holders, thus reproducing the geodesics of the cone, as in the natural grinding movements in the human mouth.

It has been found by measurement of innumerable skulls, that the axis upon which the human jaws relatively move varies according to age and that the wear on the incisors is small compared with the molars, yet in later life and in some peculiar cases this varies. To accommodate the variation in different persons' jaws, the axis upon which the upper jaw model holder 77 rocks may be adjusted at its properly calculated center of oscillation to vary its inclination with respect to the plane of occlusion of the teeth carried by the jaw model holders.

It will be obvious that the instrument can be varied to accommodate dentures of different size, by varying the vertical relation of the support 32 with respect to the base, which adjustment not only varies the distance of the condyle center corresponding to the axis of the bore 39, with respect to the plane of occlusion, but also varies the position of the intersecting of the inclined axis of the trunnions 52 with the plane of occlusion.

I do not desire to limit my invention to the precise details of construction and arrangement herein set forth, as it is obvious that various modifications may be made therein without departing from the essential features of my invention as defined by the appended claims.

Having thus described my invention, I claim:

1. A dental articulator comprising opposed jaw model holders pivotally connected together on an axis inclined with respect to the plane of occlusion, and having means to vary the inclination of said axis about a point disposed above the region of the medial incisal point.

2. A dental articulator comprising a lower jaw model holder, an upper jaw model holder pivotally connected therewith and arranged to oscillate with the medial incisal point, describing a geodesic line about the surface of a cone, and means disposed above said medial incisal point arranged to vary the angle of inclination of the axis of relative movement.

3. A dental articulator comprising a lower jaw model holder, an upper jaw model holder pivotally connected therewith and arranged to oscillate with the medial incisal point, describing a geodesic line about the surface of a cone, and means arranged to vary the angle of inclination of the axis of relative movement about an axis extending transversely to the axis of relative movement and intersecting in normal relation a perpendicular to the plane of occlusion, extending from the region of said incisal joint.

4. A dental articulator comprising a lower jaw model holder, an upper jaw model holder pivotally connected with said lower jaw model holder on an axis disposed in a plane oblique to the plane of occlusion, and means adjustable to lineally vary the distance between said jaw model holders.

5. A dental articulator comprising a lower jaw model holder, an upper jaw model holder, pivotally connected with said lower jaw model holder on an axis disposed in a plane oblique to the plane of occlusion, a hinged connection affording relative movement of said jaw model holders toward and from each other, and means distinct from said hinged connection adjustable to lineally vary the distance between said jaw model holders.

6. A dental articulator comprising opposed jaw model holders pivoted for relative movement upon an axis inclined with respect to the plane of occlusion, and turn-buckle mechanism adapted to lineally vary the distance between said jaw model holders.

7. A dental articulator comprising a lower jaw model holder, an upper jaw model holder pivotally connected therewith on an axis disposed oblique to the plane of occlusion, means respectively supporting said jaw model holders and having normally abutted threaded shanks whose respective threads are oppositely pitched, a sleeve in threaded connection therewith arranged when rotated to relatively move said jaw model holders lineally, and means arranged to limit the relative lineal movement of said jaw model holders.

8. A dental articulator comprising a base, a lower jaw model holder longitudinally adjustable with respect to said base, a super-support carried by said base and adjustable vertically with respect thereto, a swinging hanger carried by said super-support upon an axis disposed oblique to the occlusal plane, and an upper jaw model holder adjustable with respect to said hanger and carried thereby.

9. A dental articulator comprising a lower jaw model holder, an upper jaw model holder pivotally connected therewith and arranged to oscillate with the medial incisal point, describing a geodesic line about the surface of a cone, and means arranged to vary the angle of inclination of the axis of relative rotation comprising relatively movable frames respectively mounted to rock upon relatively transverse axes.

10. A dental articulator comprising a base, a lower jaw model holder adjustably carried by said base, a support hingedly connected with said base and carrying an upper jaw model holder in opposition to said lower jaw model holder, an outer frame pivotally mounted on said support upon a horizontal axis, an inner frame pivotally supported by said outer frame upon an axis disposed oblique to the plane of occlusion, and a hanger to which said upper jaw model holder is attached, pivoted to said inner frame upon an axis transverse to said oblique axis.

11. A dental articulator comprising a base, a lower jaw model holder adjustable on said base, a support hingedly connected with said base, a frame pivotally carried by said support, a second frame pivoted to the first mentioned frame upon an axis disposed oblique to the plane of occlusion, a hanger pivotally carried by said second frame, an upper jaw model holder adjustably supported by said hanger, in opposition to said lower jaw model holder, means arranged to adjustably secure said first mentioned frame to said support in any desired adjusted position, and means arranged to adjustably secure said hanger to said second mentioned frame in any adjusted position.

12. A dental articulator comprising a base, a lower jaw model holder adjustably carried by said base, an upper jaw model holder disposed in opposition to said lower jaw model holder, a support for said upper jaw model holder hingedly connected with said base and having means to limit its rocking movement with respect to said base, a frame pivotally connected with said support and having a sector, a second frame pivotally connected with the first mentioned frame upon an axis disposed oblique to the plane of occlusion and having a sector, a hanger pivotally suspended from said second mentioned frame for adjustably supporting said upper jaw model holder, means for securing the sector of said first mentioned frame in different positions to vary the axis of relative movement of said frames, and means to adjustably secure the sector of said second mentioned frame to said hanger, to vary the relative position of said hanger and said axis.

13. A dental articulator comprising a base, a lower jaw model holder adjustably carried by said base, a support hingedly connected with said base, a frame pivotally mounted on said support upon a horizontal axis, a second frame pivotally carried by the first mentioned frame upon an axis oblique to the plane of occlusion, a hanger pivotally carried by the second mentioned frame, an upper jaw model holder adjustable with respect to said hanger, and means arranged to vary the distance between said support and said base and thereby cause the said inclined axis to intersect the plane of occlusion in different longitudinal positions.

14. A dental articulator comprising a base, a lower jaw model holder adjustably mounted on said base, a support hingedly connected with said base upon an axis determining the occlusal plane, a frame pivotally carried by said support upon a horizontal axis, a second frame pivotally carried by the first mentioned frame upon an axis disposed oblique to said plane of occlusion, a hanger pivotally carried by the second mentioned frame, an upper jaw model holder adjustably carried by said hanger, means adjustable to vary the angle of the inclined axis with respect to said support and hanger, means arranged to vary said support with respect to the axis of relative oscillation of said support and base, and means arranged to vary said axis of relative oscillation with respect to said base.

15. A dental articulator comprising opposed jaw model holders, means supporting said jaw model holders hingedly connected upon an axis substantially coincident with the occlusal plane, and having an axis disposed oblique to the plane of occlusion upon which one of said jaw model holders may be laterally rocked with respect to the other, means arranged to vary the lineal distance between said jaw model holders, and means arranged to vary the axis of said hinged connection with respect thereto.

16. A dental articulator comprising opposed jaw model holders, a guide for the lower jaw model holder having an upwardly extending threaded shank, a support for the upper jaw model holder, a hinged connection between said guide and said support having a depending threaded shank normally abutted with said upwardly extending threaded shank and having its threads oppositely inclined with respect thereto, and a sleeve embracing said shanks and having its opposite end portions in threaded engagement therewith, rotatable to cause said threaded shanks and the parts connected therewith to separate or approach.

17. A dental articulator comprising opposed jaw model holders, a base carrying the lower jaw model holder, a lower hinge member adjustably connected with said base and arranged to be raised and lowered with respect thereto, to vary the height of the hinge axis, an upper hinge member having an upwardly extending post, a shaft connecting said hinge members, oppositely disposed links connected with said base and having slots through which said shaft extends, a support for the upper jaw model holder mounted for vertical adjustment upon said post, and a universally pivoted hanger carried by said support to which the upper jaw model holder is adjustably connected.

In witness whereof, I have hereunto set my hand this 15th day of March, A. D., 1917.

MAURICE J. BABB.

Witnesses:
EDWARD C. KIRK,
EDWARD F. SAMPSON, Jr.

Copies of this patent may be obtained for five cents each, by addressing the "Commissioner of Patents, Washington, D. C."